A. KANENGIETER.
POTATO CLEANING, SORTING, AND LOADING APPARATUS.
APPLICATION FILED MAY 17, 1921.
1,431,814.
Patented Oct. 10, 1922.
2 SHEETS—SHEET 1.
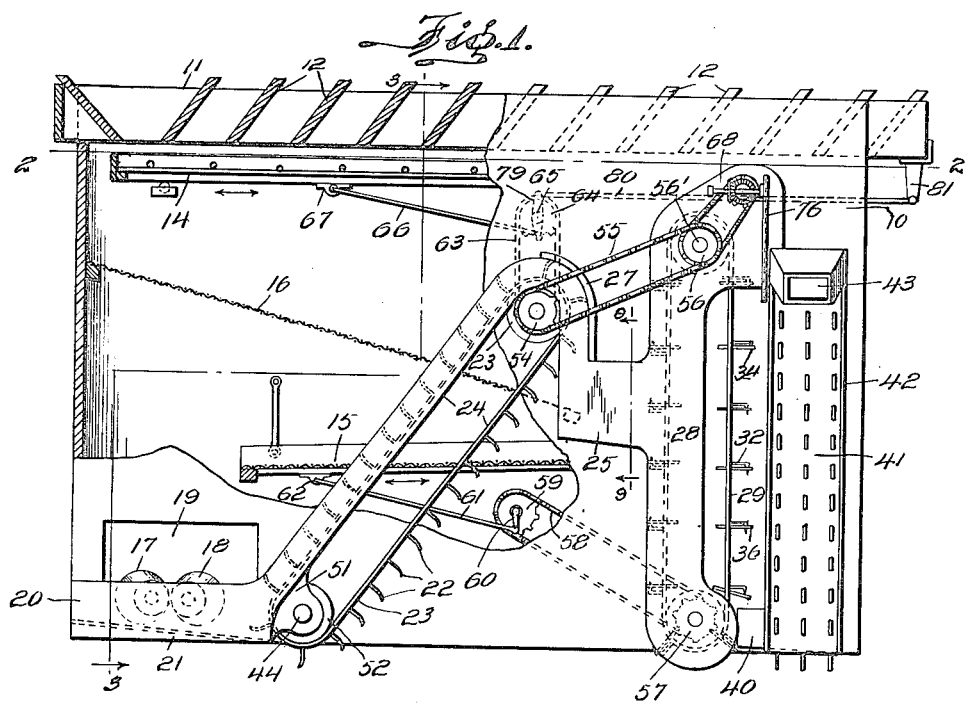
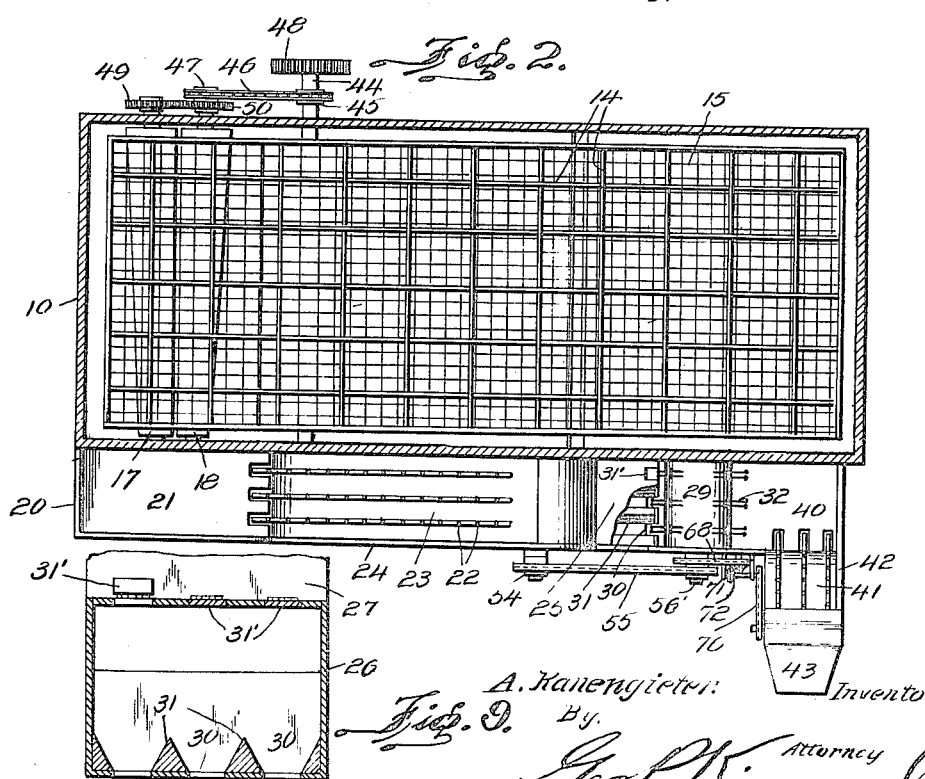
A. Kanengieter,
Inventor.
By Geo. P. Kimmel,
Attorney

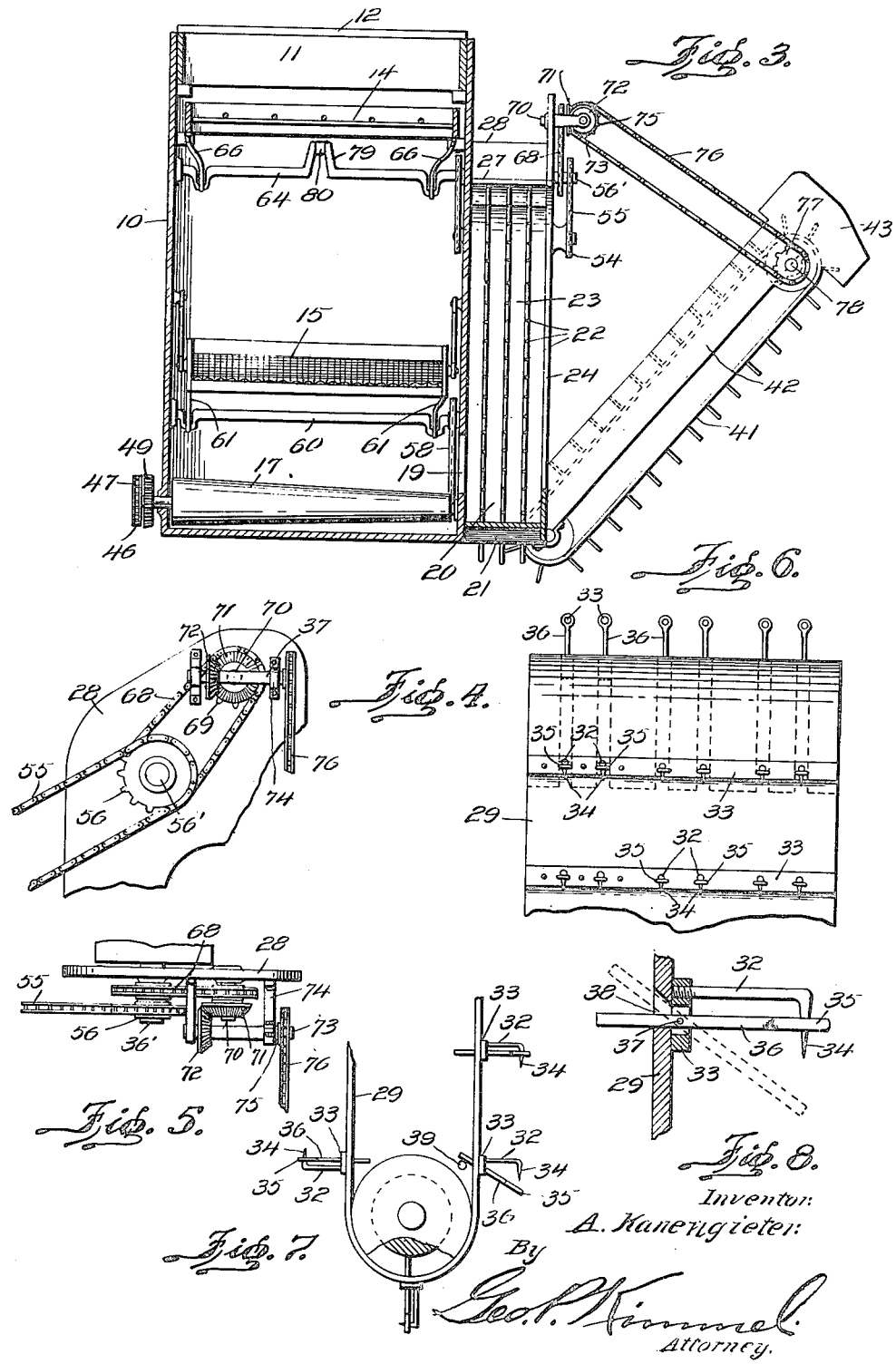

Patented Oct. 10, 1922.

1,431,814

UNITED STATES PATENT OFFICE.

ALBERT KANENGIETER, OF WILLOW LAKES, SOUTH DAKOTA.

POTATO CLEANING, SORTING, AND LOADING APPARATUS.

Application filed May 17, 1921. Serial No. 470,450.

*To all whom it may concern:*

Be it known that I, ALBERT KANENGIETER, a citizen of the United States, residing at Willow Lakes, in the county of Clark and State of South Dakota, have invented certain new and useful Improvements in Potato Cleaning, Sorting, and Loading Apparatus, of which the following is a specification.

The invention relates to improvements in potato picker apparatus, and more particularly to a type of such apparatus adapted to be associated with, or otherwise carried on a potato digging machine, and has for its principal objects to provide for an efficient sorting means for the potatoes as they are dug out of the ground; for separating the potatoes from any clinging vine portions; and to otherwise effect a thorough freeing and separating, or cleaning of the same from dirt and stones which may be delivered with the potatoes to the apparatus during the operation of the same.

With the foregoing and other objects in view, the invention resides in the certain novel and useful construction and arrangement of parts as will be hereinafter more fully described, set forth in the appended claims, and illustrated in the accompanying drawings, in which:—

Figure 1 is a front elevation, partly in section, of the preferred embodiment of the apparatus, Fig. 2 is a horizontal section taken on the line 2—2 of Fig. 1, Fig. 3 is a vertical transverse section taken on the line 3—3 of Fig. 1, Fig. 4 is a fragmentary detail showing certain of the elevator and conveyor gearing, Fig. 5 is a plan view of the gearing as in Fig. 4, Fig. 6 is an enlarged fragmentary detail of the picker elevator for effecting the final separation of the potatoes from the dirt and stones present with the same, and for the sorting out of the larger size potatoes.

Fig. 7 is an enlarged fragmentary detail of the picker elevator showing the manner of releasing the picker arm for the discharge of the picked potatoes therefrom, Fig. 8 is an enlarged fragmentary sectional detail of one of the picker devices per se, and, Fig. 9 is a sectional detail taken on the line 9—9 of Fig. 1.

Referring to the drawings, wherein similar characters of reference designate corresponding parts in the several views thereof, the numeral 10 indicates a receptacle capable of being suitably mounted on, or otherwise associated with many of the ordinary forms of potato digging machines (not shown), on which is adapted to have the potatoes delivered to and discharged into its upper open end for the cleaning, picking and sorting operation. The upper open end of the receptacle 10 is adapted to receive a removable open frame 11 which is provided with a series of transversely extending partitions 12, which are inclined in the rearward direction of the apparatus, whereby to direct the potatoes discharged onto the partitions 12 inwardly of the receptacle, and the vines thereof rearwardly over the several partitions for the discharge of the same at the rear end of the receptacle 10, the frame 11 being reciprocated for such purpose as will be hereinafter more fully explained. Extending horizontally of the upper portion of the receptacle 10 in a plane immediately below the lower edges of the partitions 12 is a wire screen 14, preferably of a mesh to permit of the passage of potatoes of large size to the interior of the receptacle 10, and this screen 14 is to be reciprocated, for the initial freeing of the potatoes from their clinging vines as they are discharged from between the partitions 12 and in their passage through the mesh of the same, the free detached vines being gripped by an operator, before they can pass into the interior of the receptacle, and are thrown by him to the ground in rear of the potato digger. The potatoes pass from the mesh of the screen 14 and drop onto a second reciprocating screen 15 on which they are jostled along the same toward the forward end. To assure that all of the potatoes fall onto the screen 15, a stationary screen 16 is superposed above the forward end of the screen 15, and inclined downwardly and rearwardly of the forward end wall of the receptacle with its free inner end spaced above the screen 15 sufficiently to permit of the free passage of the potatoes under the same in their forward movement on the reciprocating screen 15. The vibration or jostling movement imparted to the potatoes in their forward movement on the screen 15 is sufficient to loosen the same from practically all inhering dirt, pebbles or the like, so that the same are discharged from the forward end of the screen in a comparatively clean condition.

The potatoes discharged from the end of the screen 15 fall onto a pair of longitudinally tapering rollers 17 and 18, and are delivered outwardly of an opening 19, formed in the outer side wall of the receptacle 10, and are discharged therefrom into a compartment 20 which has its bottom wall 21 inclining downwardly and rearwardly, whereby the potatoes are successively caught up by a series of conveyor fingers 22 carried on an endless conveyor belt or chain 23. In their passage along the rollers 17 and 18, the potatoes are finally freed from any small portions of clinging vines that may have remained attached to the same in their passage over the screens 14, 15 and 16. The potatoes are conveyed by the belt or chain conveyor 23 upwardly of the inclined frame 24 and are discharged from the conveyor fingers 22 rearwardly of the upper end of the frame 24, and into a picker or sorting box or container 25.

The picker or sorting box 25 is supported at one end, as at 26, from the upper end of the conveyor frame 24, and this supporting portion 26 constitutes a guide channelway substantially continuous with the conveyor frame 24 for directing the potatoes from the conveyor belt 23 into the box 25, and is inclosed on the curved line of the upper adjacent end portion of said conveyor frame by means of a plate 27, and at its other end from the vertically disposed inclosing boxing 28 of a picker conveyor belt or chain 29.

The picker box 25 has the open end edge of its bottom wall formed with a set of rearwardly opening slots 30, upwardly through which are adapted to pass the complemental pairs of picker arms, to be hereinafter more fully described, of the picker conveyor belt or chain 29, and extending in parallel relation one with respect to the other between each of the slots 30, and at the outer side of the outer oppositely disposed slot, are a set of oppositely bevelled guide members 31 which are to direct the potatoes toward the slots 30, and, consequently, into the path of the upwardly moving picker arms, as aforesaid. However, only the larger of the potatoes and stones, if any still remain therewith, will be caught by the picker arms, while the smaller potatoes and stones will drop through the openings to the ground. The free edge of the upper wall of the box 25 is formed with slotted openings, one in vertical alinement with respect to each of the slots 30, and these slots are normally closed by spring tensioned doors or closures 31' which are hinged for outward upward movements, and are moved to open position upon the upward movement of the picker arms which have, in their upward passage through the slots 30, picked up a potato for the conveying of the same to the delivery conveyor of the apparatus.

The picker arms designated 32, are arranged in pairs spaced in transverse relation across the width of the belt or chain 29, and each project outwardly of the other face of the latter from a supporting plate 33 in which they are secured, and which, is in turn secured in proper position on the belt face. The free ends of the picker arms 32 are provided with angularly bent and sharpened end portions 34 which are adapted to pierce, or otherwise engage in a potato in the travel of the picker arms 32 upwardly of the slots 30 of the picker box 25, and normally engaged over the bent portions 34 is the looped end portion 35, of a potato release lever 36, which is pivoted, as at 37, in the plate 33, and which have their inner free end projecting inwardly of a series of slotted openings 38 formed in the belt or chain 29. In the upward travel of the picker arms 32, the pointed end 34 of each pair of the same pierce a potato, and carries the same upward of the box 25, and through the openings in the top wall of the latter. If the potato is properly and securely engaged in position on the picker arms 32, the doors 31' will be opened by the force exerted thereon by the potato and picker arms 32 in their upward movement, and the potato will be conveyed over the upper end of the frame 28, and then downward of the opposite side of the latter. However, if a potato is not engaged in proper position on the pairs of picker arms 32, and is offset to one side of the same, the potato will strike the intermediate portions of the upper wall of the box 25, between the hinged closures 31, and will be thrown back into the picker box. The potatoes remain engaged on the pairs of picker arms 32 until nearly at the lower end of the rearward and downward travel of the picker belt 29, where the inner projecting ends of the levers 36 strike a trip member or bar 39, and are thrown to released position, as shown in dotted lines in Fig. 8, and in full lines as is shown in Fig. 7, when the potatoes will be passed into a compartment 40 at the base of a laterally and upwardly inclined delivery conveyor belt 41, which is mounted on a frame 42, the upper end of this latter conveyor belt 41, being adapted to discharge the picked and sorted potatoes outwardly of a belt 43, and into a sack attached thereto, or into a wagon, or receptacle disposed at the outer side of the apparatus. In the case of large stones being caught up on the pairs of picker arms 36, and carried upwardly through the doors 31', the same will be conveyed to the top of the conveyor frame 28 and will be thrown to ground in rear of the potato compartment 40, such being possible since the stones are not pierced by the points 34 of the picker arms 32.

Power for the operation of the apparatus just described and provided for, is applied, from a suitable source, not shown, to the main shaft 44 which extends transversely of the bottom wall of the receptacle 10, and mounted on the inner projecting end of the shaft is a sprocket 45 which is connected, by means of a sprocket chain 46, to a sprocket 47 carried on the projecting end of the shaft of the inner roller 18, whereby rotary movement is imparted to the latter, and similar movement, in a reversed direction, is imparted to the roller 17 through the medium of meshing gears 49 and 50 mounted on the complemental ends of the shafts of the rollers 17 and 18, respectively. A suitable power element, gear or pulley 48 is keyed on the extreme inner end of the main shaft 44 for the application of power thereto. The outer end of the shaft 44 is journaled in a bearing 51 carried at the lower end of the conveyor frame 24, at the front side of the apparatus, and inwardly of the bearings 51, a sprocket or conveyor pulley 52 is keyed for rotation with the shaft 44. The rotation of the sprocket or pulley 52 drives the conveyor chain or belt 23, and it, in turn, drives a sprocket or pulley 53 journaled in the upper end of the conveyor frame 24. A sprocket 54, keyed on the shaft of the pulley 53, is connected, by means of a sprocket chain 55, to a sprocket 56 on a shaft 56' journaled in the upper end of the picker conveyor frame 28, for the driving of the picker chain or belt 29. In its travelling movement, the picker chain or belt 29 rotates a pulley at the lower end of its supporting frame 28, which, in turn, rotates a sprocket 57 adjacent thereto, and this sprocket is connected, by means of a sprocket chain 58, to a sprocket 59 carried on a crank shaft 60 passing transversely through the receptacle 10, for the reciprocation of the lower screen 15 and through the medium of a pair of pitmans 61 pivotally connecting the opposite sides of the frame of the screen 15, as at 52, with the crank arms of the crank shaft 60. A second sprocket is journaled on the shaft of the pulley 53, at the upper end of the conveyor frame 24, in rear of the same, and is connected, by means of a sprocket chain 63, to a sprocket 64 keyed on a second crank shaft 64, also extending transversely of the receptacle 10, and to the crank arms of this crank shaft 65 is connected one end of each of a pair of pitmans 66 adapted for reciprocating the upper screen 14, and for such purpose, are pivotally connected at their other end, as at 67, to the opposite sides of the said screen. For transmitting motion to the delivery conveyor 41, a second sprocket is mounted on the same shaft 56', as the sprocket 56, and the same is connected, by means of a sprocket chain 68, to a sprocket 69 keyed on a shaft 70 journaled in the extreme upper end portion of the picker conveyor frame 28, and mounted on the outer end of this shaft 70 is a bevelel gear 71 arranged in mesh with a second bevel gear 72, which, in turn, is keyed on a short shaft section 73 journaled in a bracket bearing 74 on the outer face of the frame 28. Mounted on the opposite end of a shaft 73 is a sprocket 75 which is connected, by means of a sprocket chain 76, to a sprocket 77 keyed on the conveyor pulley shaft 78 which is journaled in the upper outer end of the delivery conveyor frame 42. For reciprocating the frame 11, the crank shaft 64 is formed to provide an intermediate crank arm 79 which is connected, by means of a pitman rod 80, to a bracket arm 81 which is secured to the under side of the rear end of the frame.

It is well understood that, while the apparatus has been described in specific terms and illustrated in detail in its preferred form of construction and arrangement of parts, various changes and modifications of the same may be resorted to without departing from the spirit of the invention, or from the scope of the claims appended hereto.

Having thus fully described the invention, what is claimed is:—

1. A potato cleaning, sorting and loading apparatus comprising a receptacle, means within the upper part of said receptacle for effecting the partial cleaning of the potatoes passed therethrough, a means within said receptacle below said first mentioned means for receiving the potatoes therefrom and the freeing of the same from all particles of dirt adhering thereto, means for conveying the cleaned potatoes from the lower side of said receptacle and delivering the same to said separating means, means for separating the smaller potatoes from the larger sizes of the same and discharging the smaller of the potatoes to ground, means for picking individual potatoes of the larger sizes from among all of the potatoes delivered to said separating means and conveying the same from the point of separation, means for effecting the release of the picked potatoes from said picking means, and means for conveying the picked potatoes from their point of release from the picking means to the point of delivery of the apparatus.

2. A machine for the purpose set forth comprising a receptacle having its upper end open and further having a compartment communicating therewith, said compartment offset with respect to the lower portion of one side of said receptacle, a reciprocatory screen at the upper end of the receptacle for freeing the potatoes from the vines clinging thereto, an inclined stationary deflecting element within the receptacle for directing the potatoes discharged from said screen rearwardly, a forwardly extending and downwardly inclined reciprocatory screen within the receptacle for receiving the potatoes from said element for cleaning them from all adhering pebbles and dirt and for discharging them forwardly of the receptacle, means for feeding the discharged potatoes laterally into said compartment, a sorting element, means for conveying the potatoes in said compartment to said sorting element, means for picking up and conveying the larger sizes of said potatoes from said sorting element, and means for discharging the potatoes of smaller size from said sorting element.

3. A machine for the purpose set forth comprising a receptacle having its upper end open and further having a compartment communicating therewith, said compartment offset with respect to the lower portion of one side of said receptacle, a reciprocatory screen at the upper end of the receptacle for freeing the potatoes from the vines clinging thereto, an inclined stationary deflecting element within the receptacle for directing the potatoes discharged from said screen rearwardly, a forwardly extending and downwardly inclined reciprocatory screen within the receptacle for receiving the potatoes from said element for cleaning them from all adhering pebbles and dirt and for discharging them forwardly of the receptacle, means for feeding the discharged potatoes laterally into said compartment, a sorting element, means for conveying the potatoes in said compartment to said sorting element, means for picking up and conveying the larger sizes of said potatoes from said sorting element, and means for discharging the potatoes of smaller size from said sorting element, and means for discharging the larger sizes of the potatoes.

4. A machine for the purpose set forth comprising a receptacle, a potato receiving compartment opening into said receptacle, a reciprocatory screen operating in the receptacle or freeing the potatoes from the vines clinging thereto, an inclined stationary deflecting element for directing the potatoes discharged from said screen rearwardly, a reciprocatory screen arranged under said element for receiving and cleaning potatoes delivered from said element and for discharging the potatoes forwardly, means within the receptacle for feeding the discharged potatoes into said compartment, a potato sorting element, means for conveying the potatoes from said compartment to said sorting element, means for picking up and conveying the larger sizes of said potatoes from said sorting element, and means for discharging the potatoes of smaller sizes from said sorting element.

5. A machine for the purpose set forth comprising a receptacle, a potato receiving compartment opening into said receptacle, a reciprocatory screen operating in the receptacle for freeing the potatoes from the vines clinging thereto, an inclined stationary deflecting element for directing the potatoes discharged from said screen rearwardly, a reciprocatory screen arranged under said element for receiving and cleaning potatoes delivered from said element and for discharging the potatoes forwardly, means within the receptacle for feeding the discharged potatoes into said compartment, a potato sorting element, means for conveying the potatoes from said compartment to said sorting element, means for picking up and conveying the larger sizes of said potatoes from said sorting element, means for discharging the potatoes of smaller sizes from said sorting element, and means for discharging the potatoes of larger sizes.

6. A machine for the purpose set forth comprising a receptacle having its upper end open and further having a compartment communicating therewith, said compartment offset with respect to the lower portion of one side of said receptacle, a reciprocatory screen at the upper end of the receptacle for freeing the potatoes from the vines clinging thereto, an inclined stationary deflecting element within the receptacle for directing the potatoes discharged from said screen rearwardly, a forwardly extending and downwardly inclined reciprocatory screen within the receptacle for receiving the potatoes from said element, for cleaning them from all adhering pebbles and dirt and for discharging them forwardly of the receptacle, means for feeding the discharged potatoes laterally into said compartment, a sorting element, means for conveying the potatoes in said compartment to said sorting element, means for picking up and conveying the larger sizes of said potatoes from said sorting element, and means for discharging the potatoes of smaller size from said sorting element, means for automatically freeing the potatoes of larger sizes from said pick up means after the potatoes have been conveyed, and means for discharging the potatoes freed from said pick up means.

7. A machine for the purpose set forth comprising a receptacle, a potato receiving compartment opening into said receptacle, a reciprocatory screen operating in the receptacle for freeing the potatoes from the vines clinging thereto, an inclined stationary deflecting element for directing the potatoes discharged from said screen rearwardly, a reciprocatory screen arranged under said element for receiving and cleaning potatoes delivered from said element and for discharging the potatoes forwardly, means within the receptacle for feeding the discharged potatoes into said compartment, a potato sorting element, means for conveying the potatoes from said compartment to said sorting element, means for picking up and conveying the larger sizes of said potatoes from said sorting element, means for discharging the potatoes of smaller sizes from said sorting element, means for automatically freeing the potatoes of larger sizes from said pick up means after the potatoes have been conveyed, and means for discharging the potatoes which have been freed from said pick up means.

8. A machine for the purpose set forth comprising a receptacle, superposed potato cleaning and discharging mechanisms arranged therein, means for conveying the potatoes discharged from the lowermost of said mechanism from said receptacle, a potato sorting element, means for conveying the discharged potatoes to said sorting element, means for picking up and conveying the larger sizes of potatoes from said sorting element and conveying them to a point of delivery, means for discharging the potatoes of smaller size from said sorting element, and means for discharging the potatoes of the larger size after being conveyed to a point of delivery.

9. A machine for the purpose set forth comprising a receptacle, superposed potato cleaning and discharging mechanisms arranged therein, means for conveying the potatoes discharged from the lowermost of said mechanisms from said receptacle, a potato sorting element, means for conveying the discharged potatoes to said sorting element, means for picking up and conveying the larger sizes of potatoes from said sorting element and conveying them to point of delivery, means for discharging the potatoes of smaller size from said sorting element, means for discharging the potatoes of the larger size after being conveyed to a point of delivery, and means for automatically freeing the potatoes of larger size from said picking up means to provide for the delivery of the potatoes of larger size.

10. A machine for the purpose set forth comprising potato cleaning mechanisms, a sorting element, means for conveying the cleaned potatoes thereto, means traveling through said sorting element for picking up the potatoes of larger size and conveying them to a point of delivery, said picking up means including potato holding elements, means for freeing the potatoes from said holding elements for delivery of the potatoes, and means for discharging the freed potatoes.

11. A machine for the purpose set forth comprising potato cleaning mechanisms, a sorting element, means for conveying the cleaned potatoes thereto, means traveling through said sorting element for picking up the potatoes of larger size and conveying them to a point of delivery, said picking up means including potato holding elements, means for freeing the potatoes from said holding elements for delivery of the potatoes, means for discharging the freed potatoes, and means for discharging the potatoes of smaller size from the sorting element.

In testimony whereof, I affix my signature hereto.

ALBERT KANENGIETER.